US010292336B2

(12) United States Patent
Olander et al.

(10) Patent No.: US 10,292,336 B2
(45) Date of Patent: May 21, 2019

(54) SYSTEM FOR OPTIMIZING BALE DROP LOCATIONS WITHIN A FIELD

(71) Applicant: AGCO Corporation, Hesston, KS (US)

(72) Inventors: Brian D. Olander, Buhler, KS (US); Cedric J. Blough, Moundridge, KS (US)

(73) Assignee: AGCO Corporation, Duluth, GA (US)

( * ) Notice: Subject to any disclaimer, the term of this patent is extended or adjusted under 35 U.S.C. 154(b) by 589 days.

(21) Appl. No.: 14/423,174

(22) PCT Filed: Aug. 8, 2013

(86) PCT No.: PCT/US2013/054118
§ 371 (c)(1),
(2) Date: Feb. 23, 2015

(87) PCT Pub. No.: WO2014/031355
PCT Pub. Date: Feb. 27, 2014

(65) Prior Publication Data
US 2015/0216125 A1 Aug. 6, 2015

Related U.S. Application Data

(60) Provisional application No. 61/692,036, filed on Aug. 22, 2012.

(51) Int. Cl.
*A01F 15/08* (2006.01)
*A01F 15/07* (2006.01)
(52) U.S. Cl.
CPC .......... *A01F 15/0875* (2013.01); *A01F 15/07* (2013.01); *A01F 15/0883* (2013.01)

(58) Field of Classification Search
None
See application file for complete search history.

(56) References Cited

U.S. PATENT DOCUMENTS

2006/0086263 A1   4/2006   Degen

FOREIGN PATENT DOCUMENTS

DE    4244387 A1    7/1994
EP    1886549 A1    2/2008

OTHER PUBLICATIONS

European Patent Office, International Search Report for International Patent Application No. PCT/US2013/054118, dated Apr. 12, 2013.

*Primary Examiner* — Thomas E Worden

(57) ABSTRACT

A baler for forming crop bales and releasing or dropping the bales at targeted drop locations in a field includes a bale-forming chamber, a bale carrier rearward of the bale forming chamber, a geographic location sensor, and a control system. The bale-forming chamber forms the bales and the bale carrier supports at least one crop bale thereon and releases the bale therefrom when actuated. The geographic location sensor outputs signals corresponding with a geographic location of the baler. The control system has a plurality of targeted bale drop locations stored therein, and is configured to calculate a distance from the current baler position to a first targeted drop position and calculate a distance from the current baler position to a second targeted drop position and compare the distances to determine a desired drop location to generate a signal to command the bale carrier to release the crop bale therefrom.

6 Claims, 7 Drawing Sheets

SYSTEM FOR OPTIMIZING BALE DROP LOCATIONS WITHIN A FIELD

CROSS REFERENCE TO RELATED APPLICATION

This application claims the benefit of U.S. Provisional Application No. 61/692,036, entitled SYSTEM FOR OPTIMIZING BALE DROP LOCATIONS WITHIN A FIELD filed Aug. 22, 2012, which is hereby incorporated by reference in its entirety.

BACKGROUND OF THE INVENTION

Technical Field

The present disclosure is generally related to agricultural balers and, more particularly, to a baler having a system for optimizing bale drop locations within a field.

Background

A baler travels or is towed through an agricultural field to gather crops and processes these crops to make bales. When a bale is formed, it may be automatically dropped in the field directly following completion thereof or commanded to be dropped therefrom by an operator of the baler at a time and location of the operator's choosing. Operators often desire to pick when and where to drop a bale to facilitate later retrieval of the bale, but manually determining the time and place to drop a bale creates extra workload on the operator and may not result in the optimum drop location.

Therefore, there is a need for an improved method and apparatus for determining when and where to drop bales in a field.

OVERVIEW OF THE INVENTION

Embodiments of the present invention solve the above-mentioned problems and provide a distinct advance in the art of crop bailing. A baler for forming crop bales may include a bale-forming chamber, a bale carrier rearward of the bale forming chamber, a geographic location sensor, and a control system. The bale-forming chamber may gather and form the crop bales and the bale carrier may support at least one crop bale thereon and release the crop bale therefrom when actuated. The geographic location sensor may output signals corresponding with a geographic location of the baler. The control system has a plurality of targeted bale drop locations stored therein, and is configured to calculate a distance from the current baler position to a first targeted drop position and calculate a distance from the current baler position to a second targeted drop position and compare the distances to determine a desired drop location to generate a signal to command the bale carrier to release the crop bale therefrom.

Another embodiment of the invention is a method of determining bale drop locations within a field for crop bales formed with an agricultural baler. The method includes moving the baler along a route of travel through the field and flagging at least a first targeted bale drop position and a second targeted bale drop position in the field. Bales are formed within a bale-forming chamber as the baler moves along the route and transferring each formed bale to a bale carrier of the baler, the bale carrier operable to release the crop bale therefrom when actuated. The current position of the baler is calculated with a geographic location sensor configured to output signals representative of a geographic location of the baler when the bale carrier contains a formed bale. The method further includes calculating with a control system communicably coupled with at least one of the bale-forming chamber, the bale carrier, and the geographic location sensor a distance from the current baler position to the first targeted drop position and calculating a distance from the current baler position to the second targeted drop position. The control system compares the distances to determine a desired drop location and generates a signal to release the bale from the bale carrier.

In an additional embodiment, the method further includes calculating an estimated location of a next completed bale based on direction of travel of the baler along the route, and calculating a minimum distance from a path between the current baler position and the estimated location of the next completed bale to the first targeted drop position, and calculating a minimum distance from the path to the second targeted drop position. The minimum distances are compared to determine the desired drop location.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
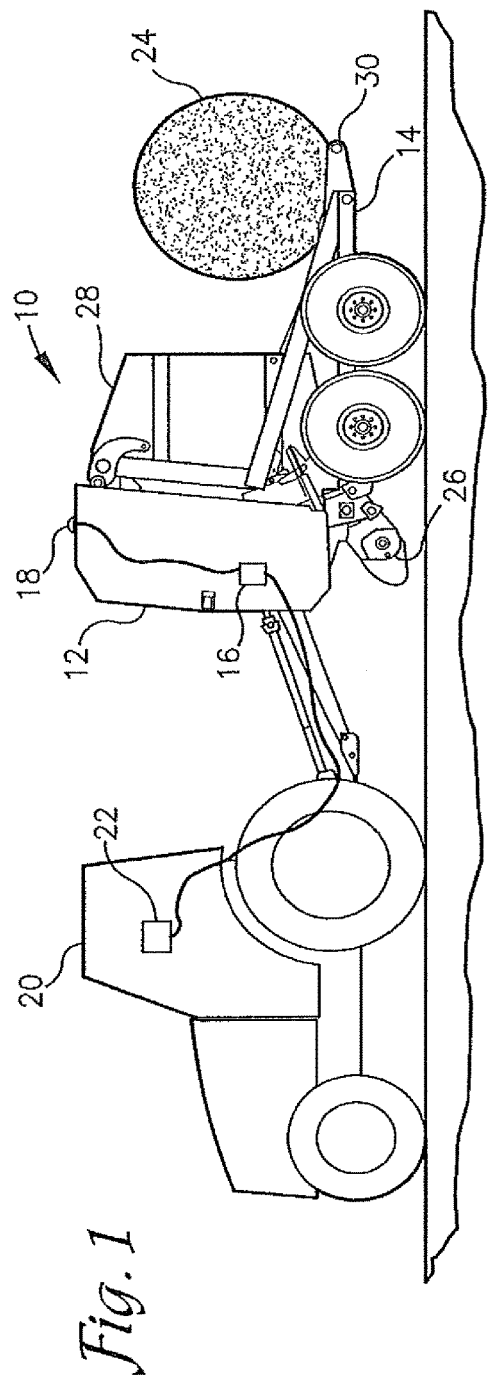
FIG. 1 is a schematic elevation view of a baler constructed in accordance with an embodiment of the present invention and towed by a tractor.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A baler 10 constructed in accordance with embodiments of the present invention is illustrated in FIGS. 1-4 and broadly includes a bale-forming chamber 12, a bale carrier 14, and a control system 16. The baler 10 may further comprise a geographic location sensor 18, such as a GPS sensor, configured to track a geographic position of the baler 10 as it travels through a field and to communicate the geographic location of the baler 10 to the control system 16. The baler 10 may also include many conventional components of known prior art balers that are not described in detail herein. Additionally, while a round baler 10 is illustrated in the Figures, one skilled in the art will understand that this invention may also be applicable to square balers as well. The baler 10 may be towed by a tractor 20 or any tow vehicle through a field of crops. The tractor 20 may have an operator terminal 22, and the control system 16 of the baler 10 may be communicably coupled to send and receive signals to and from the tractor's operator terminal 22.

The bale-forming chamber 12 may be any apparatus known in the art for forming a bale 24 or multiple bales out of various crops. The bale-forming chamber 12 may be coupled with a crop pickup device 26 configured for gathering the crops as the baler 10 is moved through the field and feeding the crop to the bale-forming chamber 12. The bale-forming chamber 12 may comprise a number of actuatable elements configured for forming the bale 24. The bale-forming chamber 12 may also comprise a rear portion 28 which is actuatable to pivot from a closed position, as in FIG. 1, to an open position, as in FIG. 2, once the bale 24 is completed. When the rear portion 28 is in the open position, the bale 24 in the bale-forming chamber 12 may slide aftward onto the bale carrier 14. Once the bale 24 is located on the bale carrier 14, the rear portion 28 may be pivoted back to the closed position so that another bale 24 may be formed in the bale-forming chamber 12.

Figure 2:
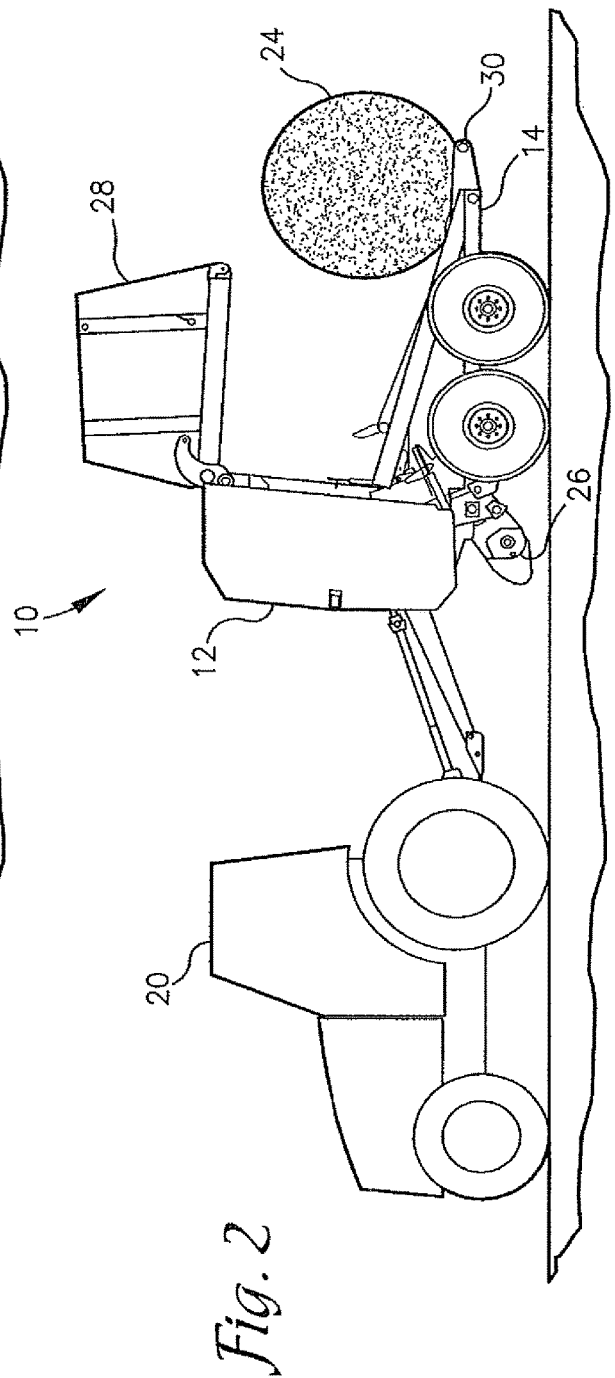
FIG. 2 is a schematic elevation view of the baler of FIG. 1, illustrating a bale-forming chamber of the baler of FIG. 1 opening to release a bale onto a bale carrier of the baler.
Figure 3:
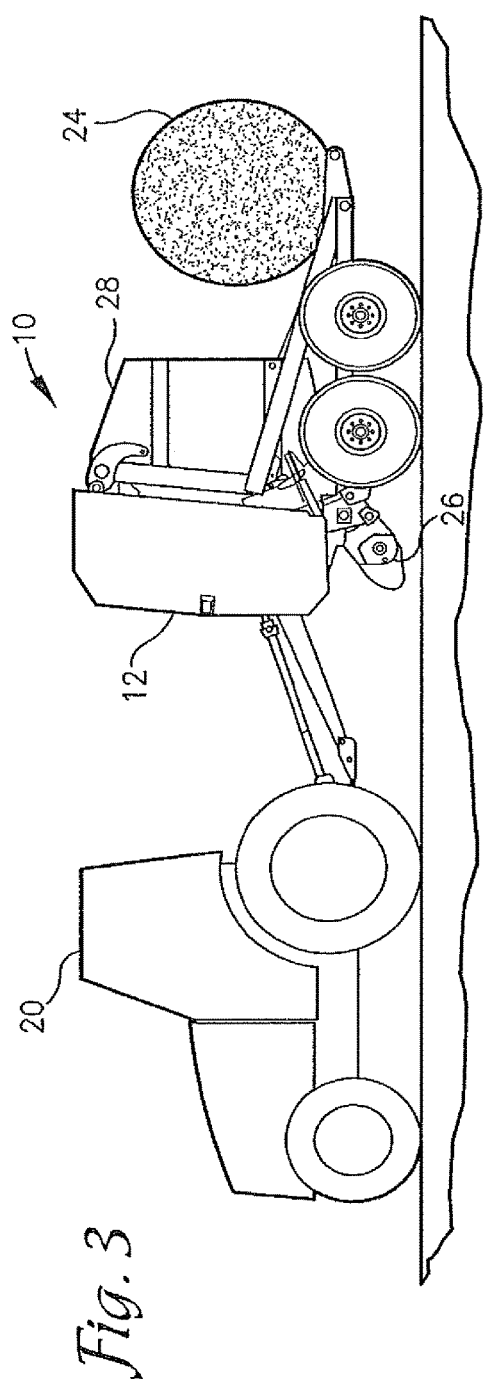
FIG. 3 is a schematic elevation view of the baler of FIG. 1, illustrating the bale being carried on the bale carrier.
Figure 4:
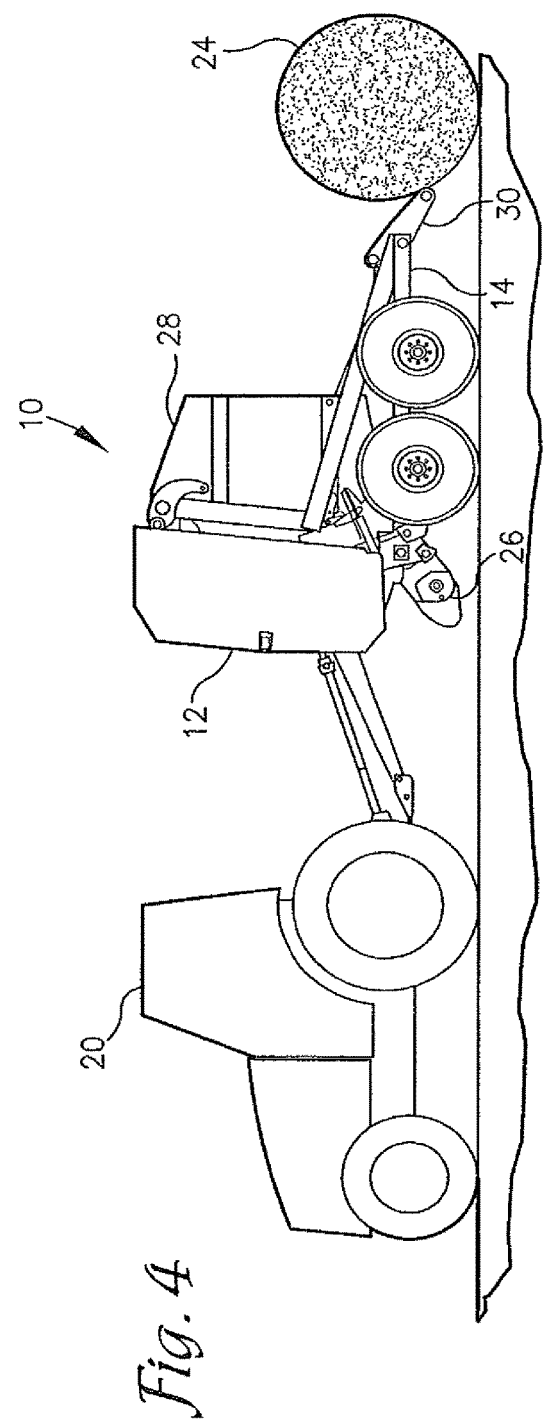
FIG. 4 is a schematic elevation view of the baler of FIG. 1, illustrating the bale carrier being actuated to drop the bale therefrom.

The bale carrier 14 may be located at a rear of the baler 10, aftward of the bale-forming chamber 12, and may be configured to carry the bale 24 to be transported to a particular area of a field while a next bale is being formed and wrapped in the bale-forming chamber 12. The bale 24 may alternatively be carried on a baler/wrapper combination or any structure that can hold the bale 24 while the next bale is being formed. The bale carrier 14 may also be configured to carry several bales at one time. The bale carrier 14 may be configured to drop or release the bale 24 or bales carried thereon, as illustrated in FIG. 4, according to commands by an operator and/or the control system 16. For example, the bale carrier 14 may have a mechanically-pivoting release ramp 30 which is angled upward or substantially parallel to the ground in a first position for preventing the bale 24 from rolling off a rear end of the bale carrier 14, as illustrated in FIGS. 1-3, and then is pivoted toward the ground to a second position, providing a ramp for the bale 24 to slide or roll off the rear end of the bale carrier 14, as illustrated in FIG. 4. The bale carrier 14 may therefore comprise one or more actuatable components communicably coupled with the control system 16 to receive commands from the control system 16 and/or to send feedback or sensor signals to the control system 16. For example, in some embodiments of the invention, a sensor or sensors may be located on the bale carrier 14 and may indicate to the control system 16 that the bale 24 is located on the bale carrier 14 or that the bale 24 has been dropped or released from the bale carrier 14.

The control system 16, as illustrated in FIG. 1, may comprise any number and combination of controllers, circuits, integrated circuits, programmable logic devices such as programmable logic controllers (PLC) or motion programmable logic controllers (MPLC), computers, processors, microcontrollers, other electrical and computing devices, and/or other data and signal processing devices for carrying out the functions described herein, and may additionally comprise one or more memory storage devices, transmitters, receivers, and/or communication busses and ports. The control system 16 may be configured for one-way and/or two-way communication with the geographic location sensor 18, the bale-forming chamber 12, and/or the bale carrier 14 or various actuators and sensors thereof. The control system 16 may be configured to communicate with the other components of the baler 10 and/or the tractor 20 or tow vehicle via wireless means, such as Wi-Fi or the like, or via wired means, such as via USB cables or the like.

In FIG. 1, the control system 16 is shown located on the baler 10. However, in alternative embodiments of the invention, the control system 16 or portions of the control system 16 may be located on the tractor 20 or tow vehicle or otherwise remotely located from the baler 10 and configured to transmit and/or receive control signals to and from the baler's actuators and sensors. For example, various computers or processors of the control system 16 may communicate and exchange information with each other and may be located in remote locations relative to each other. Furthermore, the several processors or computing devices may each be configured to execute different steps, algorithms, subroutines, or codes described herein.

The control system 16 may be configured to implement any combination of the algorithms, subroutines, or code corresponding to method steps and functions described herein. The control system 16 and computer programs described herein are merely examples of computer equipment and programs that may be used to implement the present invention and may be replaced with or supplemented with other controllers and computer programs without departing from the scope of the present invention. While certain features are described as residing in the control system 16 or its memory, the invention is not so limited, and those features may be implemented elsewhere. For example, databases accessed by the control system 16, such as databases of fields and their associated bale drop locations, may be located remotely from the control system 16 and baler 10 without departing from the scope of the invention.

In various embodiments of the invention, the control system 16 may implement a computer program and/or code segments to perform some of the functions described herein. The computer program may comprise an ordered listing of executable instructions for implementing logical functions in the control system. For example, the computer program may be a software program configured to run on any computer or processor of the tractor, tow vehicle, or baler. The computer program can be embodied in any computer-readable medium for use by or in connection with an instruction execution system, apparatus, or device, and execute the instructions. In the context of this application, a "computer-readable medium" can be any physical means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card.

As noted above, the control system 16 may comprise memory storage devices or other various memory elements. The memory may include one or more memory storage devices which may be integral with the control system, stand alone memory, or a combination of both. The memory may include, for example, removable and non removable memory elements such as RAM, ROM, flash, magnetic, optical, USB memory devices, MMC cards, RS MMC cards, SD cards such as microSD or miniSD, SIM cards, and/or other memory elements. Specifically, the memory may store at least a portion of the computer program or code segments described above, as well as user-specified preferences, information regarding user selections, bale drop locations, and the like.

In some embodiments of the invention, the control system 16 may comprise an input port configured to receive location signals from the geographic location sensor 18, an output port configured to send at least first and second control signals to the bale carrier 14, and a processor configured for calculating when to output the first and second command signals based on various stored and sensed values, as later described herein. For example, the first control signal may command the bale carrier 14 to be actuated to the first position, carrying the bale 24 thereon, and the second control signal may command the bale carrier 14 to be actuated to the second position, thereby releasing the bale 24. The control system 16 may be configured to receive information regarding a location of the baler 10 and a direction of travel of the baler 10, which may be calculated using a successive series of readings from the geographic location sensor 18. The control system 16 may also determine the baler's location relative to the bale drop locations. Furthermore, the control system 16 may comprise and/or interface with a user interface such as a mouse, keyboard, touch screen, or various data input ports whereby the user or tractor operator may input data directly into the control system 16 or otherwise exchange information with the control system. For example, the control system 16 may be communicably coupled with the tractor's operator terminal 22, as illustrated in FIG. 1, which may include various means for the operator to communicate with the control system 16, such as a user interface and a graphic display.

The geographic location sensor 18 may include a GPS receiver or any other location-determining sensors known in the art. The geographic location sensor 18 may be configured to communicate with the control system 16 regarding the location of the baler. In some embodiments of the invention, the location may be provided to the control system 16 as geographic coordinates or may be provided relative to boundaries of the field.

Figure 5:
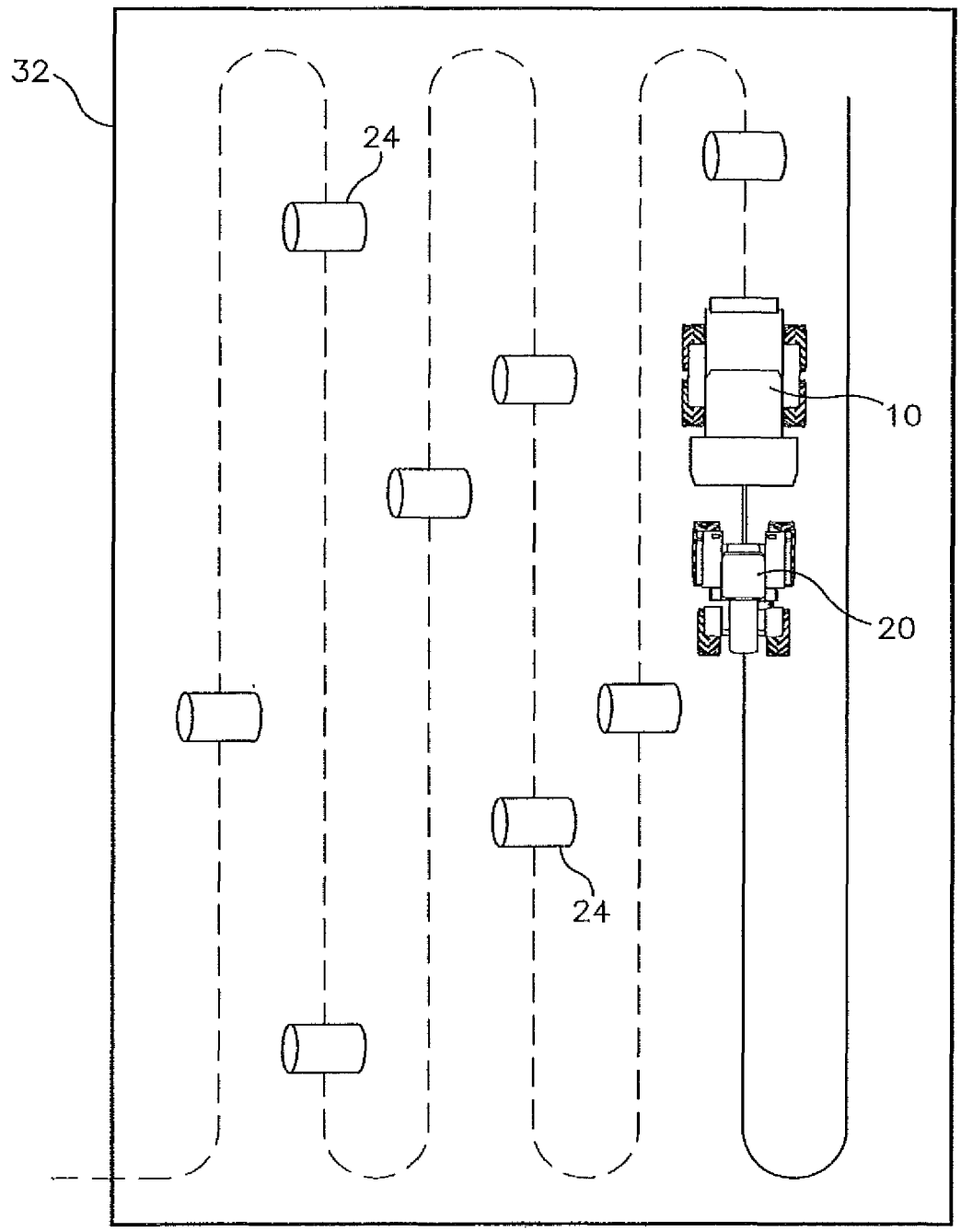
FIG. 5 is a schematic plan view of a field traveled by the baler, illustrating bales being dropped at even intervals throughout the field.
Figure 6:
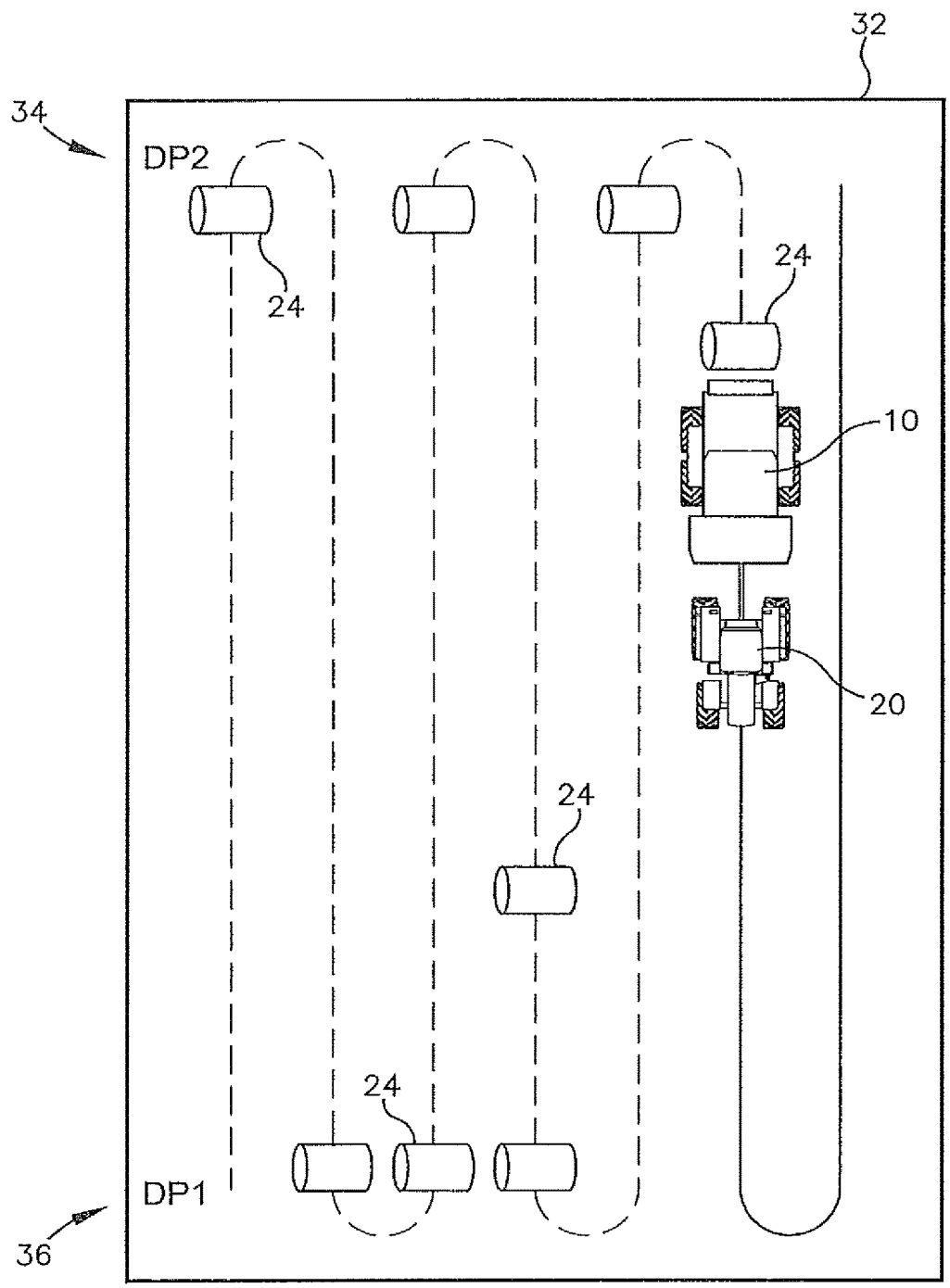
FIG. 6 is a schematic plan view of the field traveled by the baler, illustrating bales being dropped at or near drop point 1 (DP1) or drop point 2 (DP2), according to commands by a control system of the baler.

In use, the control system 16 of the baler may command the bale carrier 14 to drop a carried bale at a location nearest to a pre-determined or targeted drop location, based on a comparison of stored locations and current baler locations received from the geographic location sensor 18. The targeted drop location may be pre-programmed into the control system 16, operator-determined via the operator terminal 22, and/or identified by the control system 16 based on pre-programmed parameters regarding what conditions are required for a suitable drop location. For example, without these drop locations, the baler may drop the bales 24 at regular intervals throughout a field 32, as illustrated in FIG. 5. However, using targeted drop locations 34, 36, as illustrated in FIG. 6, the control system 16 may determine locations at or near said drop locations 34, 36 to drop the bale 24. For example, the drop locations 34, 36 may be located at either end of the field 32, such that collecting the bales 24 may be easier, since the bales 24 are not as spread out throughout the field 32. However, any locations in the field 32 may be used as drop locations without departing from the scope of the invention. Furthermore, any quantity of targeted drop locations may be selected without departing from the scope of the invention. In some embodiments of the invention, the drop location may be a particular region in which the bale 24 may be dropped. For example, the drop locations may be associated with locations at which the heading of the baler 10 and tractor 20 change (e.g., ends of the field).

In some embodiments of the invention, before or during baling, an operator of the baler 10 may "flag" a targeted drop location using the geographic location sensor 18 of the baler 10. This flagging may be accomplished by the operator pressing a button or otherwise indicating a location should be flagged when the baler 10 is at a desired drop location. Alternatively, the control system 16 may be programmed so that whenever a bale is dropped manually (by operator command in real time), the control system 16 may automatically flag the location of the baler 10 when the bale 24 is dropped. Flagging a location, as referenced herein, refers to the control system 16 saving particular geographic or GPS coordinates into the memory of the control system 16.

While making bales, the control system 16 of the baler 10 may keep track of the drop location and a current baler location. For example, the control system 16 may track the baler's movement, and if the distance between the drop location and the current baler location is getting smaller, the baler 10 may continue to carry the bale 24. Conversely, if the distance between the drop location and the current baler location starts getting larger for a set amount of time (e.g., 1 second) and there is a bale on the bale carrier 14, the control system 16 may command the baler 10 to drop the bale 24.

Figure 9:
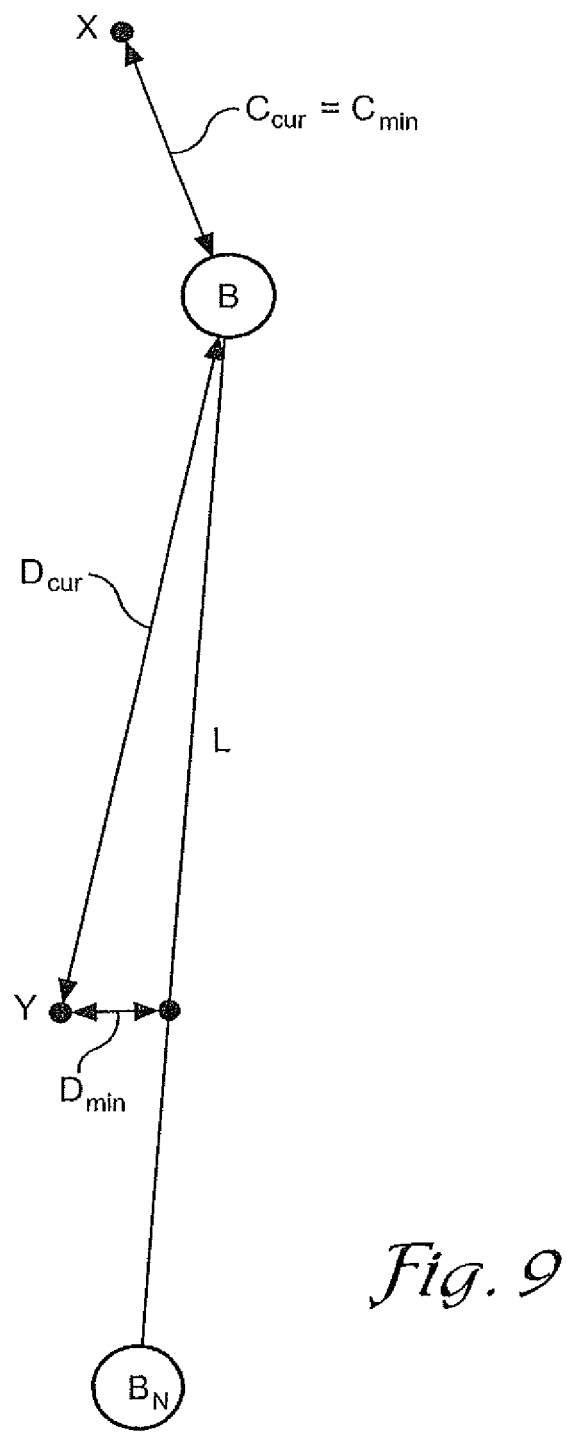
FIG. 9 is a schematic diagram corresponding to the flow chart of FIG. 8 and illustrating the distances calculated using the flow chart of FIG. 8.

In some embodiments of the invention, there may be two or more flagged drop locations, such that the baler 10 would need to determine what dropping location is closest to the baler 10 and then determine whether to drop the bale 24 or not based on the distance increasing or decreasing from the closest drop location. A more elaborate software design programmed into the control system 16 could be used to estimate when the bale 24 in the bale-forming chamber 12 will be completed, and the control system 16 may use that information to determine the best bale drop location. For example, the control system 16 may determine or be programmed to store that the average distance traveled to form a bale is 80 yards. In some embodiments of the invention, if a bale is completed and placed on the bale carrier 14 ten yards away from a drop location X and 60 yards away from a drop location Y, and the baler 10 is traveling away from drop location X and towards drop location Y, then the baler 10 may be programmed and configured to have the bale carrier 14 drop the bale 24 immediately. However, as illustrated in FIG. 9, if the baler 10 is programmed to know that another bale will not be formed for another 80 yards, and that a current vector of travel is generally in a direction of drop location Y, the baler 10 may be programmed and configured to determine that the closest possible drop point will actually be drop location Y. Therefore, in this embodiment of the invention, the baler 10 will not drop the bale 24 until the distance from the baler 10 to drop location Y is increasing.

In an alternative embodiment of the invention, the control system 16 of the baler 10 may be configured to automatically determine drop locations. For example, the control system 16 may be programmed to record bale drop locations on an initial pass of a given set of east-west or north-south windrows in a field. The software of the baler 10 could be programmed to then automatically set these points as drop locations, instead of manually setting drop locations. Then the east-west or north-south locations may be automatically matched as closely as possible via software of the baler.

In some embodiments of the invention, the control system 16 may provide a notification to the operator (e.g., audible beeps and/or a visual symbol or cue) when one of the drop locations or the optimum drop location is reached, with or without automatically dropping the bale at this location. By not automatically dropping the bale at the drop location, but rather notifying the operator that the drop location has been reached, the control system 16 may allow the operator to control the mechanism that drops the bale and to choose whether or not to drop the bale at the identified location.

Figure 7:
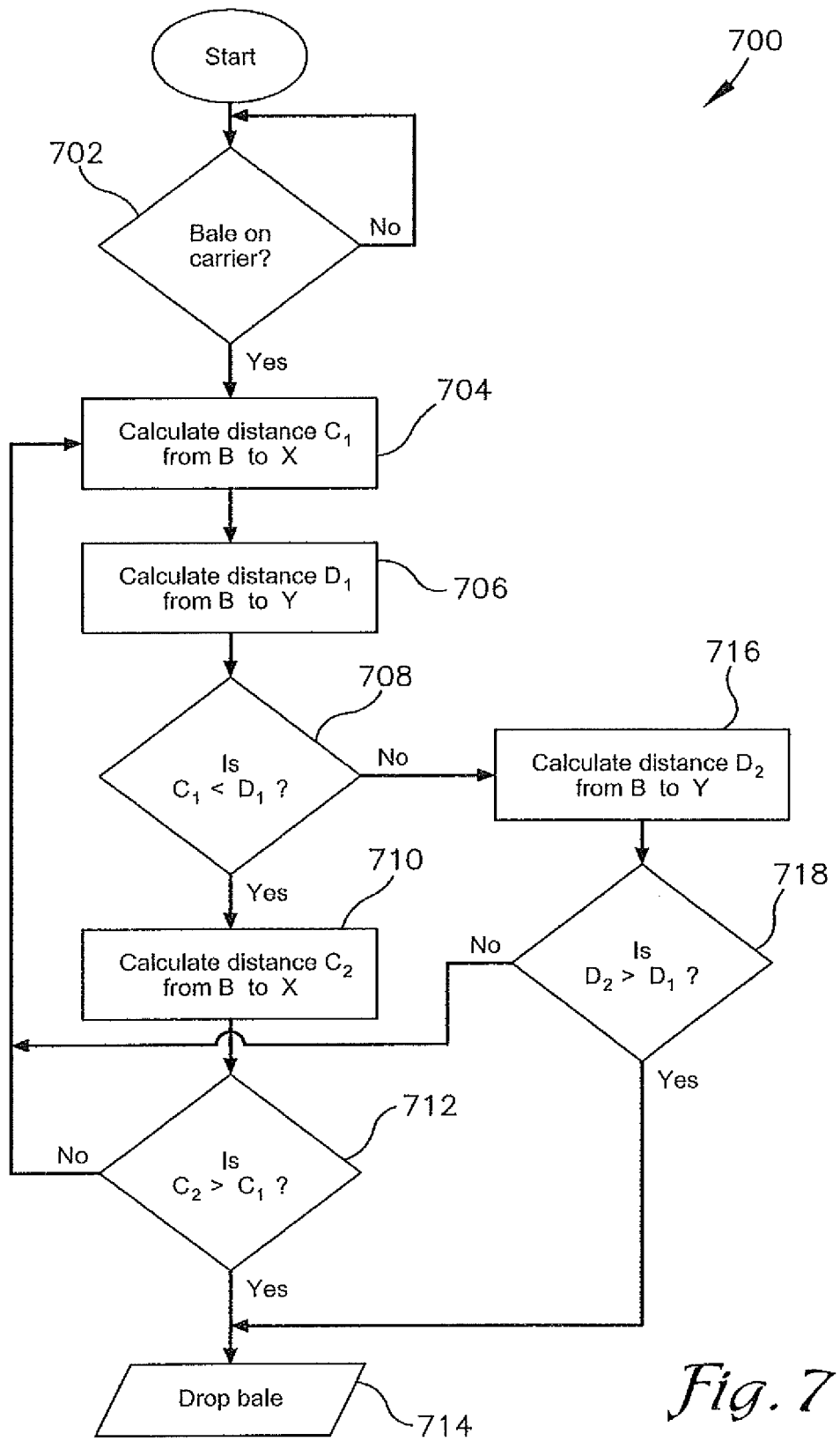
FIG. 7 is a flow chart of a method of determining when to drop a bale from the baler in accordance with one embodiment of the present invention.
Figure 8:
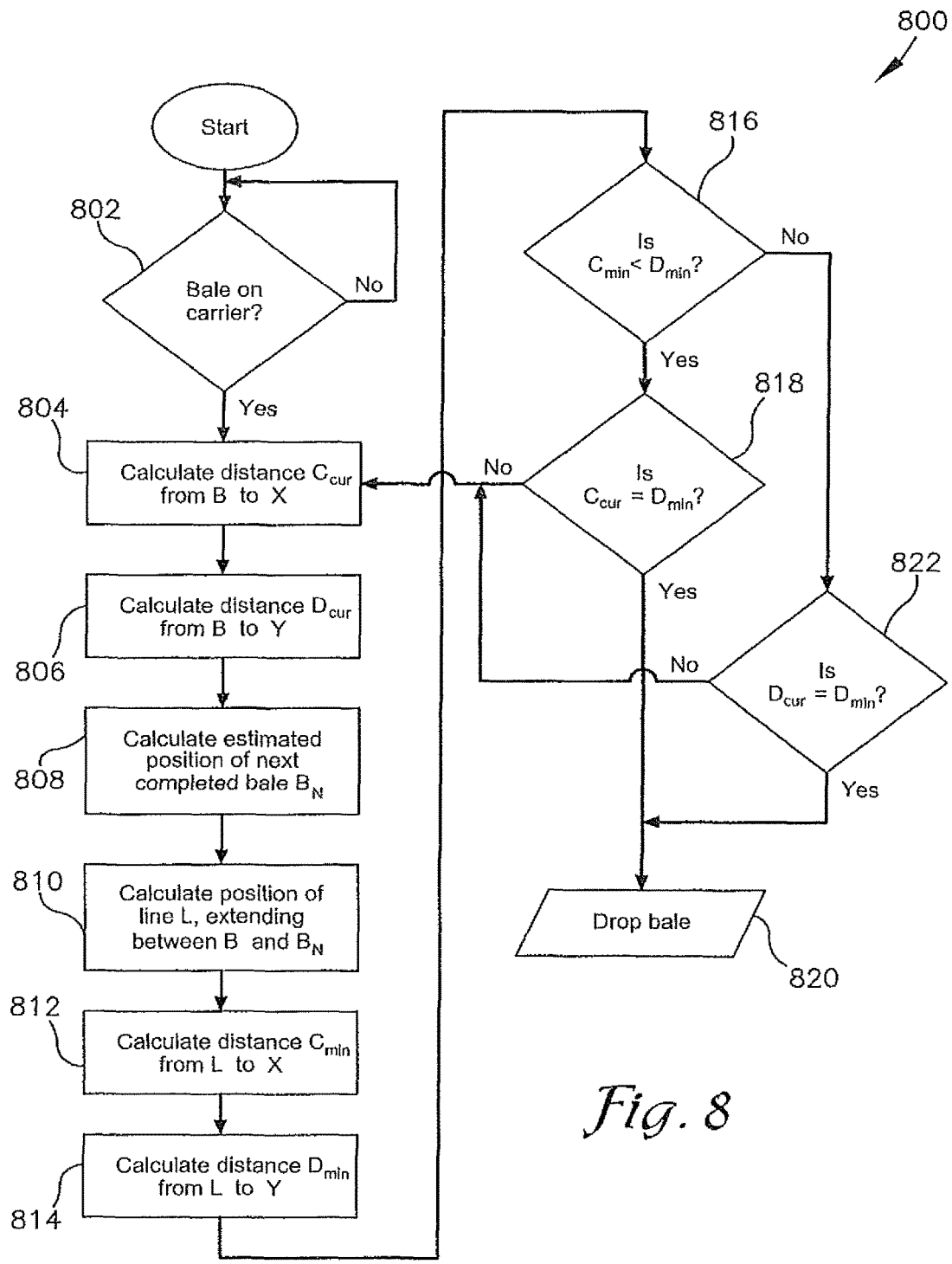
FIG. 8 is a flow chart of another method of determining when to drop a bale from the baler in accordance with another embodiment of the present invention.

The flow charts of FIGS. 7 and 8 show the functionality and operation of exemplary implementations of the present invention in more detail. In this regard, some of the blocks of the flow chart may represent steps in a method 700 or an alternative method 800 for determining when or where to command the bale carrier to drop a bale. The blocks in the flow chart may also represent a module segment or portion of code of the computer programs of the present invention. The computer programs may comprise one or more executable instructions for implementing the specified logical function or functions. In some alternative implementations, the functions noted in the various blocks may occur out of the order depicted in FIG. 7 or 8. For example, two blocks shown in succession in FIG. 7 or 8 may in fact be executed substantially concurrently, or the blocks may sometimes be executed in the reverse order depending upon the functionality involved.

As illustrated in FIG. 7, the method 700 may comprise a step of determining if the bale 24 is on the bale carrier 14, as depicted in block 702. If not, then this step 702 is repeated. Determining if the bale 24 is on the bale carrier 14 may be performed by requesting and/or receiving with the control system 16 signals from a sensor on the bale carrier 14, as described above. Next, if the bale 24 is on the bale carrier 14, the method may comprise the steps of calculating a distance (C1) from the current baler position (B) to a first drop position (X), as depicted in block 704 and calculating a distance (D1) from the current baler position (B) to a second drop position (Y), as depicted in block 706.

If the distance (C1) to the first drop position is less than the distance (D1) to the second drop position, as determined in block 708, then a distance (C2) from a subsequent current baler position (B) to the first drop position (X) is calculated, as depicted in block 710. Then, if the distance (C2) is greater than the distance (C1), as determined in block 712, the control system 16 commands the bale carrier 14 to drop the bale 24, as depicted in block 714. If the distance (C2) is not greater than the distance (C1), then the method may return to block 704, recalculating the distance (C1) to the first drop position (X) from a new current baler location.

Returning now to block 708, if the distance (C1) to the first drop position is not less than the distance (D1) to the second drop position, then a distance (D2) from a subsequent current baler position (B) to the second drop position (Y) is calculated, as depicted in block 716. Then, if the distance (D2) is greater than the distance (D1), as determined in block 718, the control system 16 commands the bale carrier 14 to drop the bale 24, as depicted in block 714. If the distance (D2) is not greater than the distance (D1), then the method may return to block 704, recalculating the distance (C1) to the first drop position (X) from a new current baler location (B).

Alternatively, as illustrated in FIG. 8, the method 800 may comprise a step of determining if the bale 24 is on the bale carrier 14, as depicted in block 802. If not, then this step 802 is repeated. Determining if the bale 24 is on the bale carrier may be performed by requesting and/or receiving with the control system 16 signals from a sensor on the bale carrier 14, as described above. Next, the method 800 may comprise the steps of calculating a distance ($C_{CUR}$) from the current baler position (B) to a first drop position (X), as depicted in block 804 and calculating a distance ($D_{CUR}$) from the current baler position (B) to a second drop position (Y), as depicted in block 806 and illustrated in FIG. 9. The method 800 may also comprise the steps of calculating an estimated location ($B_N$) of a next completed bale, as depicted in block 808 and illustrated in FIG. 9. The estimated location ($B_N$) may be determined by the control system 16 using stored or sensed data. For example, a current bale growth rate (e.g., in cubic feet/minute), a current bale volume, and a desired completed bale volume may be used by the control system 16 to estimate a time until the next bale is completed. The control system 16 may then multiply a current speed of the baler and the time until the next bale is completed to calculate a predicted distance the baler 10 will travel before completing the next bale. Using the predicted distance and a current heading of the baler 10, the estimated location ($B_N$) of the next completed bale 24 may be determined.

Next, the method 800 may include a step of determining one or more locations of a line (L) extending between the current baler position (B) and the estimated location ($B_N$) of the next completed bale, as depicted in block 810. Then, the method 800 may comprise the steps of calculating a minimum distance ($C_{MIN}$) from the line (L) to the first drop position (X), as depicted in block 812, and calculating a minimum distance ($D_{MIN}$) from the line (L) to the second drop position (Y), as depicted in block 814 and illustrated in FIG. 9. Those minimum distances ($C_{MIN}$, $D_{MIN}$) may then be compared to determine a best drop location.

Specifically, the method 800 may comprise a step of determining if ($C_{MIN}$) is less than ($D_{MIN}$), as depicted in block 816. If ($C_{MIN}$) is less than ($D_{MIN}$), the method 800 may then comprise the step of determining if ($C_{CUR}$) is equal to ($C_{MIN}$), as depicted in block 818. If ($C_{CUR}$) is equal to ($C_{MIN}$), the method 800 may then comprise the step of dropping the bale, as depicted in block 820. Specifically, the control system 16 may command the bale carrier 14 to drop the bale 24. If ($C_{CUR}$) is not equal to ($C_{MIN}$), the method 800 may repeat, returning back to the step of calculating ($C_{CUR}$), as depicted in block 804.

Returning to block 816, if ($C_{MIN}$) is not less than ($D_{MIN}$), then the method 800 may next comprise the step of determining if ($D_{CUR}$) is equal to ($D_{MIN}$), as depicted in block 822. If ($D_{CUR}$) is equal to ($D_{MIN}$), the method 800 may then proceed to the step of dropping the bale, as depicted in block 820. Again, the control system 16 may command the bale carrier 14 to drop the bale 24. If ($D_{CUR}$) is not equal to ($D_{MIN}$), the method 800 may repeat, returning back to the step of calculating ($C_{CUR}$), as depicted in block 804.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of determining bale drop locations within a field for crop bales formed with an agricultural baler, the method comprising:
    moving the baler along a route of travel through the field;
    flagging at least a first targeted bale drop position and a second targeted bale drop position in the field;
    forming bales within a bale-forming chamber as the baler moves along the route and transferring each formed bale to a bale carrier of the baler, the bale carrier operable to release the crop bale therefrom when actuated;
    calculating a current baler position with a geographic location sensor configured to output signals representative of a geographic position of the baler when the bale carrier contains a formed bale;
    calculating with a control system communicably coupled with at least one of the bale forming chamber, the bale carrier, and the geographic location sensor a distance from the current baler position to the first targeted drop position;
    calculating with the control system a distance from the current baler position to the second targeted drop position;
    comparing with the control system the distances to determine a desired drop location;
    generating a signal to release the bale from the bale carrier; and
    calculating an estimated location of a next completed bale based on direction of travel of the baler along the route, and
    wherein the steps of calculating the distances comprise calculating a minimum distance from a path between the current baler position and the estimated location of the next completed bale to the first targeted drop position, calculating a minimum distance from the path to the second targeted drop position, and comparing the minimum distances to determine the desired drop location.

2. The method of claim 1, wherein the estimated location is determined using bale growth rate and desired completed bale volume to calculate an average distance the baler will travel before completing the next bale.

3. A method of determining bale drop locations within a field for crop bales formed with an agricultural baler, the method comprising:
    moving the baler along a route of travel through the field;
    flagging at least a first targeted bale drop position and a second targeted bale drop position in the field;
    forming bales within a bale-forming chamber as the baler moves along the route and transferring each formed bale to a bale carrier of the baler, the bale carrier operable to release the crop bale therefrom when actuated;
    calculating a current baler position with a geographic location sensor configured to output signals representative of a geographic position of the baler when the bale carrier contains a formed bale;
    calculating with a control system communicably coupled with at least one of the bale forming chamber, the bale carrier, and the geographic location sensor a distance from the current baler position to the first targeted drop position;
    calculating with the control system a distance from the current baler position to the second targeted drop position;
    comparing with the control system the distances to determine a desired drop location;
    generating a signal to release the bale from the bale carrier; and
    determining if the distances from the current baler position to the first targeted drop position and from the current baler position to the second targeted drop position are increasing or decreasing to determine the desired drop location.

4. A method of determining bale drop locations within a field for crop bales formed with an agricultural baler, the method comprising:
    moving the baler along a route of travel through the field;
    flagging at least a first targeted bale drop position and a second targeted bale drop position in the field;
    forming bales within a bale-forming chamber as the baler moves along the route and transferring each formed bale to a bale carrier of the baler, the bale carrier operable to release the crop bale therefrom when actuated;
    calculating a current baler position with a geographic location sensor configured to output signals representative of a geographic position of the baler when the bale carrier contains a formed bale;
    calculating with a control system communicably coupled with at least one of the bale forming chamber, the bale carrier, and the geographic location sensor, a distance from the current baler position to the first targeted drop position;
    calculating with the control system a distance from the current baler position to the second targeted drop position;
    comparing with the control system the calculated distances to determine a desired drop location; and
    generating a signal to release the bale from the bale carrier;
    wherein a plurality of targeted bale drop positions are stored in a control system and the control system is configured to determine which of the plurality of targeted bale drop positions is closest to a current position of the baler and whether the baler is moving toward or away from the targeted bale drop position that is closest to the current position of the baler based on each position signals output by the geographic location sensor.

5. A baler for forming crop bales, the baler comprising:
a bale-forming chamber configured to gather and form the crop bales;
a bale carrier rearward of the bale-forming chamber and operable to support at least one crop bale thereon and operable to release the at least one crop bale therefrom when actuated;
a geographic location sensor configured to output signals representative of a current geographic location of the baler; and
a control system communicably coupled with at least one of the bale-forming chamber, the bale carrier, and the geographic location sensor, wherein the control system has a plurality of targeted bale drop positions stored therein, the control system configured to:
calculate a distance from the current baler position to a first targeted drop position,
calculate a distance from the current baler position to a second targeted drop position,
compare the calculated distances to determine a desired drop location to generate a signal to command the bale carrier to release the crop bale therefrom, and
calculate an estimated next completed bale targeted drop position based on a direction of travel of the baler,
wherein comparing the calculated distances requires determining a first minimum distance from a path between the current baler position and the estimated next completed bale targeted drop position to the first targeted drop position, and a second minimum distance from the path to the second targeted drop position.

6. A baler for forming crop bales, the baler comprising:
a bale-forming chamber configured to gather and form the crop bales;
a bale carrier rearward of the bale-forming chamber and operable to support at least one crop bale thereon and operable to release the at least one crop bale therefrom when actuated;
a geographic location sensor configured to output signals representative of a current geographic location of the baler; and
a control system communicably coupled with at least one of the bale-forming chamber, the bale carrier, and the geographic location sensor, wherein the control system has a plurality of targeted bale drop positions stored therein, the control system configured to:
calculate a distance from the current baler position to a first targeted drop position,
calculate a distance from the current baler position to a second targeted drop position,
compare the distances to determine a desired drop location to generate a signal to command the bale carrier to release the crop bale therefrom,
determine which of the plurality of targeted bale drop positions is closest to a current baler position and whether the baler is moving toward or away from the targeted bale drop position that is closest to the current baler position based on each position signal output by the geographic location sensor, and
command actuation of the bale carrier to release the crop bale if the baler is moving away from the targeted bale drop position that is closest to the current baler position based on each position signal output by the geographic location sensor.

* * * * *